(12) United States Patent
Hafezinasab et al.

(10) Patent No.: US 12,179,625 B2
(45) Date of Patent: Dec. 31, 2024

(54) REMOVABLE MODULE

(71) Applicant: LiveWire EV, LLC, Milwaukee, WI (US)

(72) Inventors: Hamidreza Hafezinasab, Sunnyvale, CA (US); Robert W. Sweney, San Francisco, CA (US)

(73) Assignee: LiveWire EV, LLC, Milwaukee, WI (US)

( * ) Notice: Subject to any disclaimer, the term of this patent is extended or adjusted under 35 U.S.C. 154(b) by 245 days.

(21) Appl. No.: 17/538,228

(22) Filed: Nov. 30, 2021

(65) Prior Publication Data

US 2023/0166630 A1 Jun. 1, 2023

(51) Int. Cl.
*B60L 53/80* (2019.01)
*B60K 1/04* (2019.01)

(52) U.S. Cl.
CPC ............. *B60L 53/80* (2019.02); *B60K 1/04* (2013.01); *B60L 2210/10* (2013.01)

(58) Field of Classification Search
CPC ........ B60L 53/80; B60L 2210/10; B60K 1/04
See application file for complete search history.

(56) References Cited

U.S. PATENT DOCUMENTS

| 11,841,400 B2* | 12/2023 | Izumi |
| 2013/0090795 A1* | 4/2013 | Luke |
| 2020/0254898 A1* | 8/2020 | Singhal |
| 2021/0387536 A1* | 6/2021 | Graßl |

\* cited by examiner

*Primary Examiner* — James A Shriver, II
*Assistant Examiner* — Nicholas R. Kandas
(74) *Attorney, Agent, or Firm* — Michael Best & Friedrich LLP (57) ABSTRACT

A removable module and a method for operating the removable module. The removable module has a multipurpose connector that connect the removable module to a motor when the removable module is attached to a vehicle. Dual-purpose circuitry in the removable module can output electric energy to the motor when the multipurpose connector connects the removable module to the motor. The multipurpose connector can connect the removable module to the electric vehicle supply equipment when the removable module is detached from the vehicle. While the removable module is detached from the vehicle, the dual-purpose circuitry cannot output electric energy to the motor. When the multipurpose connector connects the removable module to the electric vehicle supply equipment, the dual-purpose circuitry can receive electric power from the electric vehicle supply equipment.

9 Claims, 4 Drawing Sheets

REMOVABLE MODULE

FIELD

Embodiments described herein relate to a removable module and a method for operating the removable module.

SUMMARY

The embodiments described herein provide an improved rechargeable energy storage system.

Other aspects will become apparent by consideration of the detailed description and accompanying drawings.

BRIEF DESCRIPTION OF THE DRAWINGS

Throughout the drawing figures, like reference numerals will be understood to refer to like parts and components.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting, and coupling. Further, "connected" and "coupled" are not restricted to physical or mechanical connections or couplings, and can include electrical connections or couplings, whether direct or indirect. Also, electronic communications and notifications may be performed using any known means including direct connections, wireless connections, etc.

It should also be noted that a plurality of hardware and software based devices, as well as a plurality of different structural components may be utilized to implement the invention. In addition, it should be understood that embodiments of the invention may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (for example, stored on non-transitory computer-readable medium) executable by one or more processors. As such, it should be noted that a plurality of hardware and software based devices, as well as a plurality of different structural components may be utilized to implement the invention. For example, "control units" and "controllers" described in the specification may include processing components, such as one or more processors, one or more memory modules including non-transitory computer-readable medium, one or more input/output interfaces, and various connections (for example, a system bus) connecting the components.

Figure 1:
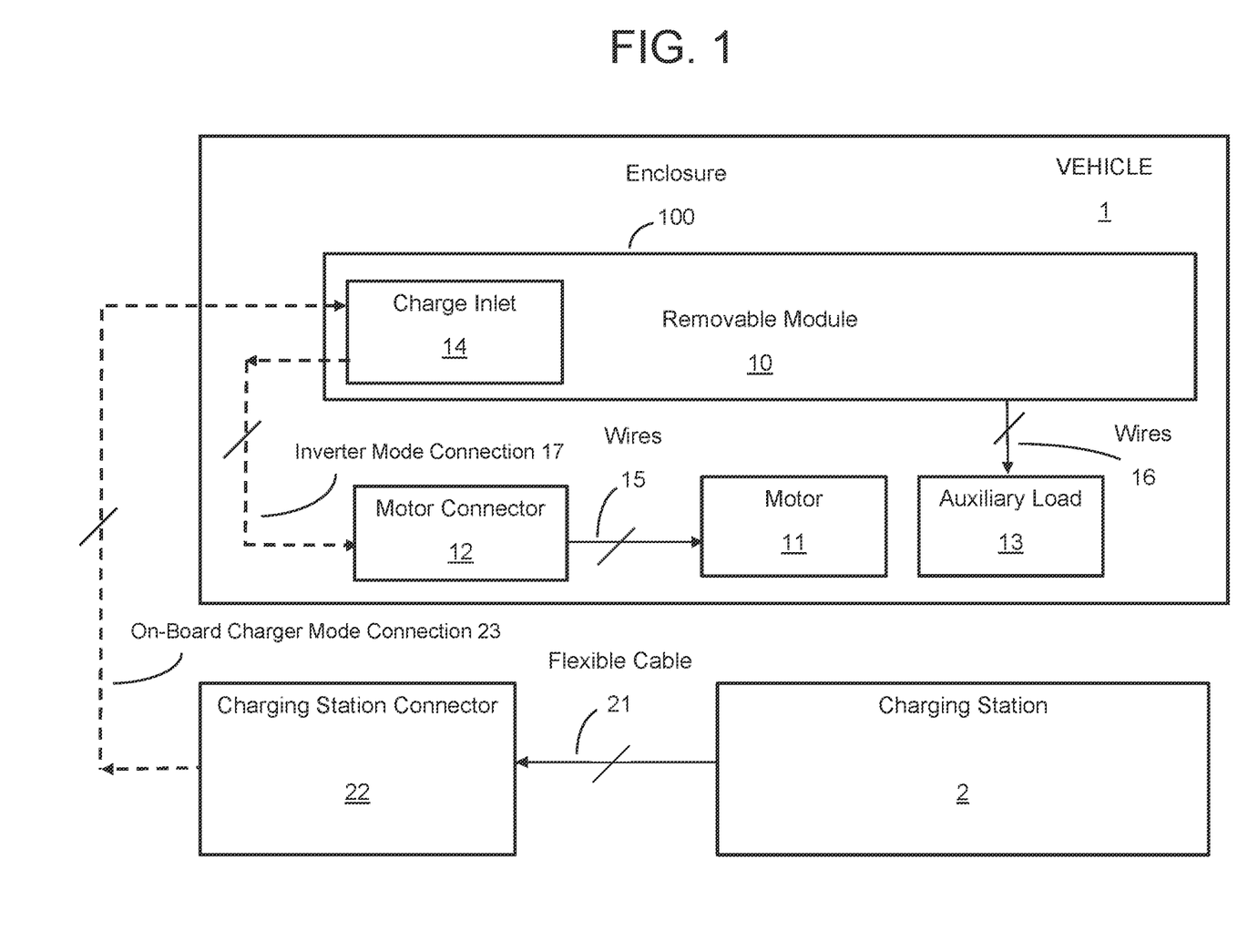
FIG. 1 schematically illustrates a vehicle and a charging station according to some embodiments.

Shown in FIG. 1 are a vehicle 1 and a charging station 2. The vehicle 1, in some embodiments, includes a removable module 10, a motor 11, a motor connector 12, an auxiliary load 13, and a charge inlet 14.

The motor 11 is an electromechanical device configured to receive the electric energy and transform the electric energy into mechanical energy. The motor 11 may receive electric energy from the removable module 10. When the motor 11 transforms the electric energy into the mechanical energy, the mechanical energy may generate a force that is sufficient to propel the vehicle 1. An electric vehicle is a vehicle that may be propelled by the motor 11. The vehicle 1 being an electric vehicle is within the scope of the invention. The vehicle 1 being a motorcycle that may be propelled by the motor 11 is also within the scope of the invention. The motor 11 may be mounted onto a chassis of the vehicle 1. The motor 11 being in the hub of a wheel of the vehicle 1 is also within the scope of the invention.

The motor 11 may be a brushed-type motor or a brushless-type motor. Motor windings for the motor 11 may in a wye winding configuration, a delta winding configuration, or a wye-delta configuration. The motor connector 12 is configured to electrically connect the removable module 10 to the motor windings of the motor 11. One or more wires 15 electrically connect the motor connector 12 to one or more electrically conductive terminals in the motor 11.

Generally referred to as electric vehicle supply equipment (EVSE), the charging station 2 is equipment that may output the electric power for charging the removable module 10. The electric power from the charging station 2 may be single-phase AC (alternating current) power or three-phase AC power. Alternatively, the electric power from the charging station 2 being DC (direct current) power is also within the scope of the invention. The charging station 2 is equipped with a flexible cable 21 for supplying the electric power from the charging station 2 to the removable module 10. In particular, the flexible cable 21 is a flexible bundle of conductors that supply the electric power from the charging station 2. At the end of the flexible cable 21 is a charging station connector 22 that is a removably connectable to the removable module 10. The charging station connector 22 is configured to electrically connect the charging station 2 to the charge inlet 14.

An arrangement for one or more of the electrical contacts in the motor connector 12 is identical to an arrangement for one or more of the electrical contacts in the charging station connector 22. By arranging one or more of the electrical contacts in the motor connector 12 identical to the arrangement for one or more of the electrical contacts in the charging station connector 22, the charge inlet 14 is configured in a such manner that mating the charge inlet 14 with the charging station connector 22 inhibits a simultaneously mating of the motor connector 12 to the removable module 10, and in a such manner that mating the charge inlet 14 with the motor connector 12 inhibits a simultaneously mating of the charging station connector 22 to the removable module 10. Also by arranging one or more of the electrical contacts in the motor connector 12 identical to the arrangement for one or more of the electrical contacts in the charging station connector 22, the motor connector 12 is incapable of mating directly with the charging station connector 22.

Figure 2:
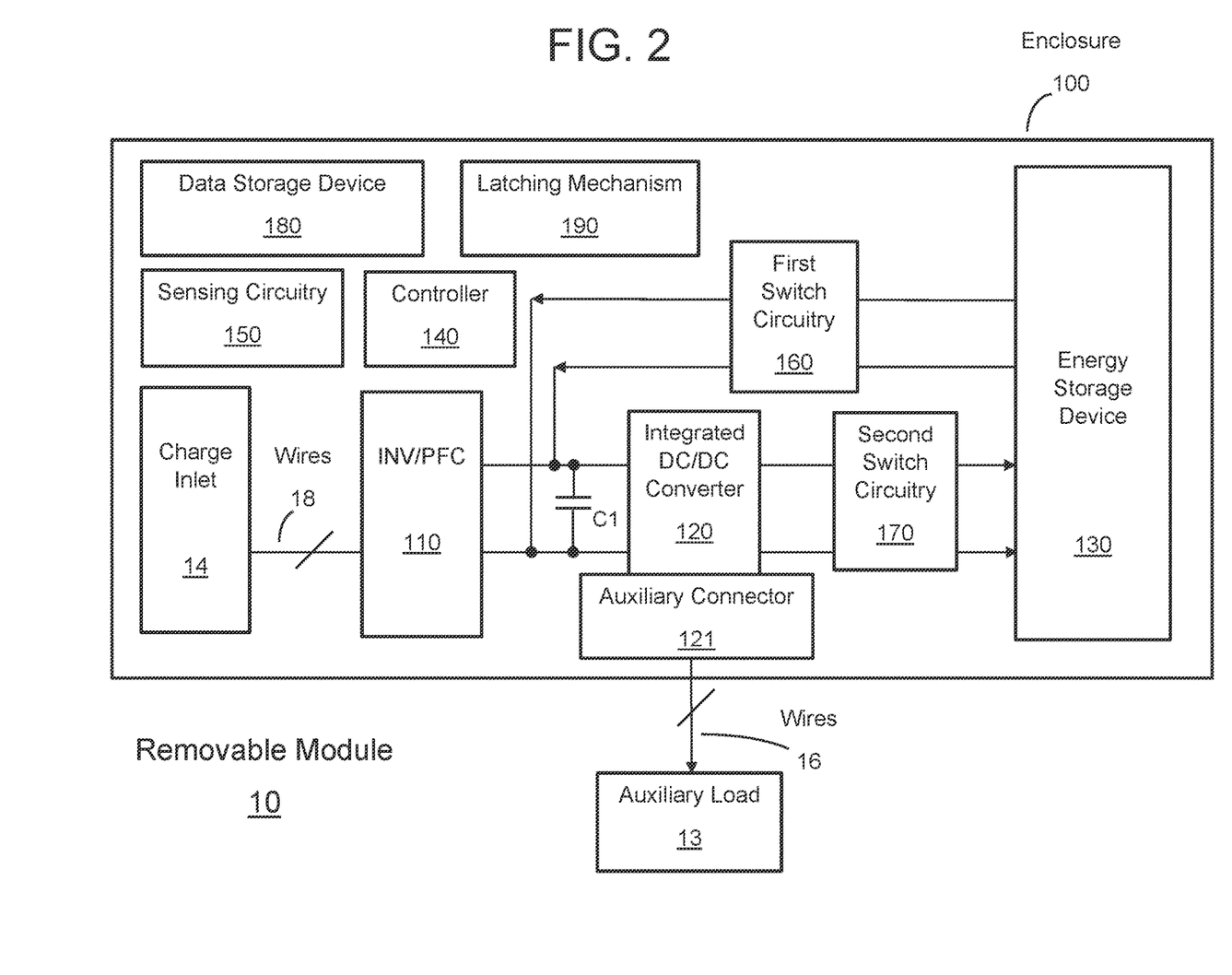
FIG. 2 schematically illustrates a removable module according to some embodiments.

FIG. 2 schematically illustrates the removable module 10. The removable module 10 is a self-contained assembly of electronic components and circuitry. The removable module 10 being a rechargeable energy storage system (RESS) is within the scope of the invention. As illustrated in FIG. 2, the removable module 10, in some embodiments, includes an enclosure 100, an INV/PFC 110, an integrated DC/DC converter 120, an energy storage device 130, a controller 140, sensing circuitry 150, first switch circuitry 160, second switch circuitry 170, and a filter capacitor C1. The INV/PFC 110, the integrated DC/DC converter 120, the sensing circuitry 150, the controller 140, the first switch circuitry 160, the second switch circuitry 170, and the filter capacitor C1 are housed within the enclosure 100 of the removable module 10.

Housed within the enclosure 100 of the removable module 10, the INV/PFC 110 is dual-purpose circuitry. In particular, the INV/PFC 110 is circuitry that is configurable to perform as an inverter (INV) in some instances and as power factor correction (PFC) circuitry in other instances.

Figure 3:
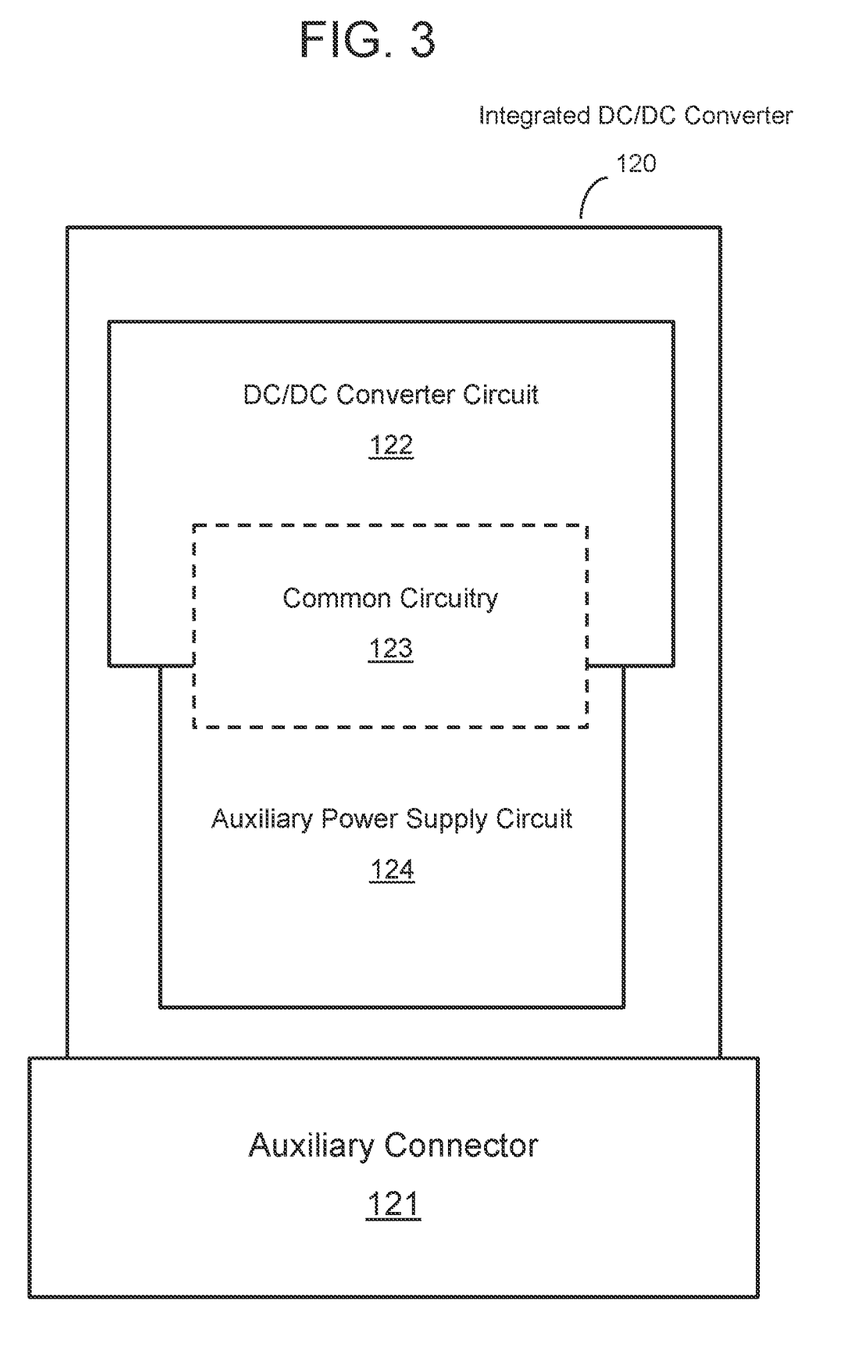
FIG. 3 schematically illustrates an integrated DC/DC converter according to some embodiments.

The integrated DC/DC converter 120 is combinational circuitry composed of a DC/DC converter circuit 122 that converts a DC current into the DC energy and an auxiliary power supply circuit 124 that converts the DC current into an auxiliary voltage. As illustrated in FIG. 3, the DC/DC converter circuit 122 and the auxiliary power supply circuit 124 share common circuitry 123. The common circuitry 123 is the portion of the DC/DC converter circuit 122 that is also a portion of the auxiliary power supply circuit 124. The common circuitry 123 is represented in FIG. 3 by the section of the integrated DC/DC converter 120 that is enclosed by the dashed line. Combining the auxiliary power supply circuit 124 with the DC/DC converter circuit 122 in the integrated DC/DC converter 120 reduces the cost of the removable module 10. The integrated DC/DC converter 120 may be a buck converter, a boost converter, or a buck-boost converter.

An auxiliary connector 121 in the integrated DC/DC converter 120 may couple the auxiliary load 13 to the integrated DC/DC converter 120 in a manner that permits disconnection of the auxiliary load 13 from the integrated DC/DC converter 120. One or more wires 16 electrically connect the auxiliary load 13 to the auxiliary connector 121.

Also housed within the enclosure 100 of the removable module 10 is the energy storage device 130. The energy storage device 130 may be a battery that stores DC energy and outputs the DC energy as a DC voltage. Also within the scope of the invention, the energy storage device 130 may be a battery module that is composed of multiple batteries connected together. The energy storage device 130 may be a rechargeable energy storage device 130 that can be charged with the DC energy, discharge the DC voltage, and be recharged by the DC energy after discharging the DC voltage.

The controller 140 may be a single electronic processor. Alternatively, the controller 140 may include multiple electronic processors. When the controller 140 is composed of multiple electronic processors, any of the individual electronic processors may be sited at a location that is different from any other of the individual electronic processors.

Sensing circuitry 150 may be a component that resides external to the INV/PFC 110. Alternatively, the sensing circuitry 150 may reside within the INV/PFC 110 or may be included in the controller 140.

Between the energy storage device 130 and the INV/PFC 110 is the first switch circuitry 160. The first switch circuitry 160 is controllable by the controller 140 in a manner that causes the first switch circuitry 160 to switch between electrically connecting the INV/PFC 110 to the energy storage device 130 and electrically disconnecting the energy storage device 130 from the INV/PFC 110.

Between the energy storage device 130 and the integrated DC/DC converter 120 is the second switch circuitry 170. The second switch circuitry 170 is controllable by the controller 140 in a manner that causes the second switch circuitry 170 to switch between electrically connecting the integrated DC/DC converter 120 to the energy storage device 130 and electrically disconnecting the energy storage device 130 from the integrated DC/DC converter 120.

Outside the enclosure 100 of the removable module 10 is an auxiliary load 13. The auxiliary load 13 may be an auxiliary battery that stores the auxiliary voltage. The auxiliary load 13 may alternatively be an electronic device. The auxiliary load 13 being a combination of the auxiliary battery and the electronic device is also within the scope of the invention. The integrated DC/DC converter 120 is removably connectable to the auxiliary load 13 in a manner that permits the detachment of the auxiliary load 13 from the removable module 10. The detachment of the auxiliary load 13 from the removable module 10 being manual detachment of the auxiliary load 13 from the removable module 10 is within the scope of the invention. Disconnection of the auxiliary load 13 from the integrated DC/DC converter 120 detaches the auxiliary load 13 from the removable module 10.

As a problem in the art, implementations of a power storage system for a vehicle, such as a typical electric vehicle (EV), may include an AC charge inlet, a power electronics module, and a rechargeable battery. The power electronics module for the typical EV is designed to remain connected to the typical EV during the charging of the battery. Furthermore, the motor of the typical EV may not be electrically connected to the AC charge inlet when charging the battery of the typical EV. Instead, an electrical connection to the motor must be broken while the battery of the typical EV is being charged. Similarly, during motoring, any electrical connection that may exist between the motor the AC charge inlet must be broken to prevent the AC charge inlet from becoming electrically energized. For these electrical connections to be broken, electrical relays in the typical EV may connect and disconnect the AC charge inlet and the motor windings to and from the power electronics module. However, these electrical relays in the typical EV are expensive and bulky.

As a solution to this and other problems in the art, the removable module 10 is capable of being removed, displaced, or transferred. As shown in FIG. 2, the removable module 10 has a latching mechanism 190 that removably affixes the removable module 10 to any structure of the vehicle 1 when the latching mechanism 190 is engaged. The removable module 10 is configured to be detached from the vehicle 1 so as to separate the removable module 10 from the vehicle 1, and is configured to be attached to the vehicle 1 so as to affix the removable module 10 to the vehicle 1. The latching mechanism 190 permits detachment of the removable module 10 from the vehicle 1 when the latching mechanism 190 is disengaged. Detachment of the removable module 10 from the vehicle 1 may permit separation of the removable module 10 from the vehicle 1. Separating the removable module 10 from the vehicle 1 disconnects the removable module 10 from the motor 11.

During the time that the removable module 10 is separated from the vehicle 1, the removable module 10 may be coupled to the charging station connector 22. The removable module 10 receiving the electric power from the charging station 2 when the removable module 10 is coupled to the charging station connector 22 is within the scope of the invention.

During the time that the removable module 10 is affixed to the vehicle 1, the removable module 10 may be coupled to the motor connector 12. The removable module 10 outputting the electric energy to the motor 11 when the removable module 10 is coupled to the motor connector 12 is within the scope of the invention.

To eliminate the need for electrical relays that switch between a connection of a power electronics module to motor windings and a connection of the power electronics module to an AC charge inlet, the removable module 10 is detachable from the vehicle 1 so as to separate the removable module 10 from the vehicle 1 for the purpose of coupling the removable module 10 to the charging station 2, and is removably attachable to the vehicle 1 so as to affix the removable module 10 to the vehicle 1 for the purpose of coupling the removable module 10 to the motor 11.

The charge inlet 14 may be mounted directly onto the enclosure 100 of the removable module 10. Also within the scope of the invention, the charge inlet 14 may be housed within the enclosure 100 of the removable module 10. The charge inlet 14 is a multipurpose connector. In particular, the charge inlet 14 is a connector that is configured to mate with the charging station connector 22 in a manner that couples the INV/PFC 110 to the charging station 2. The charge inlet 14 is also a connector that is configured to mate with the motor connector 12 in a manner that couples the INV/PFC 110 to the motor windings of the motor 11. One or more wires 15 in the removable module 10 may electrically connect the INV/PFC 110 to the charge inlet 14.

One or more of wires 18 electrically connect one or more electrically conductive terminals in the charge inlet 14 to one or more electrically conductive terminals in the INV/PFC 110.

In FIG. 1, an inverter mode connection 17 and an on-board charger mode connection 23 are alternative connections.

The dashed line in FIG. 1 connecting the charge inlet 14 to the motor connector 12 is the inverter mode connection 17, which is one or more electrical connections between the charge inlet 14 and the motor connector 12. The inverter mode connection 17 may exist during the inverter mode of operation and is absent during the on-board charger mode of operation.

The dashed line in FIG. 1 connecting the charge inlet 14 to the charging station connector 22 is an on-board charger mode connection 23, which is of one or more electrical connections between the charging station connector 22 and the charge inlet 14. The on-board charger mode connection 23 may exist during the on-board charger mode of operation and is absent during an inverter mode of operation.

Prior to the on-board charger mode of operation, the removable module 10 is detached from the vehicle 1 so as to permit a coupling of the charging station 2 to the INV/PFC 110. The charge inlet 14 is configured in such a manner that mating the charge inlet 14 with the charging station connector 22 inhibits a simultaneously mating of the motor connector 12 to the removable module 10. The removable module 10 may be disconnected from the vehicle 1 to separate the removable module 10 from the vehicle 1 so that the removable module 10 may receive electric power from the charging station 2 while the removable module 10 is detached and apart from the vehicle 1.

Connecting the removable module 10 to the charging station 2 mates the charge inlet 14 with the charging station connector 22, as shown in FIG. 1 by the on-board charger mode connection 23 connecting the charge inlet 14 to the charging station connector 22.

Software may be stored in a data storage device 180. The data storage device 180 may be any non-transitory device capable of storing electronic information. The non-transitory device being read-only memory (ROM) is in the scope of the invention. The non-transitory device may be read-write memory. The non-transitory device may be non-volatile memory. The software may be computer code. The computer code being embodied in the data storage device 180 is within the scope of the invention. The computer code, when executed by the removable module 10 causes the removable module 10 to perform the steps in FIG. 4. The software may be loaded to and executed by the controller 140, thereby causing the controller 140 to control the removable module 10 when the removable module 10 performs the steps in FIG. 4.

Figure 4:
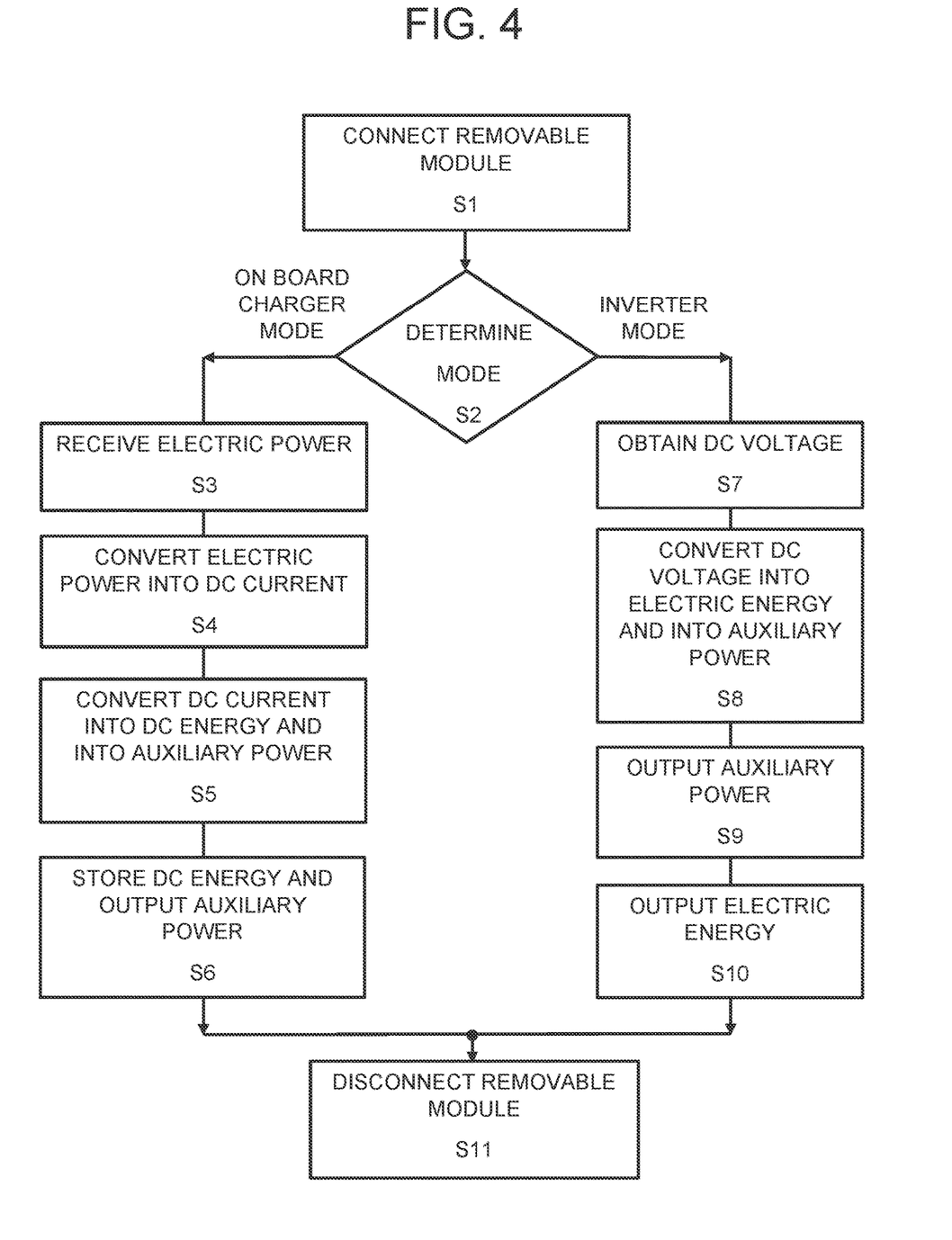
FIG. 4 is a flow diagram illustrating an example of a method for operating a removable module according to some embodiments.

The charge inlet 14 may couple the removable module 10 to the charging station connector 22 during the on-board mode of operation. FIG. 4 shows that manually connecting the charge inlet 14 to the charging station 2 in Step S1 may commence the on-board charger mode of operation.

When the charging station 2 is connected to the removable module 10, the sensing circuitry 150 may detect that the removable module 10 is coupled to the charging station connector 22 in a manner that permits the removable module 10 to determine in Step S2 of FIG. 4 that the removable module 10 is in the on-board charger mode of operation. In particular, with the removable module 10 detached from the vehicle 1 and attached to the charging station 2, the sensing circuitry 150 may detect a coupling between the removable module 10 charging station connector 22 and in Step S2.

To detect the coupling between the removable module 10 and the charging station connector 22 in Step S2, an electrically conductive terminal in the charging station connector 22 may come into contact with an electrically conductive terminal in the charge inlet 14 when the removable module 10 is connected to the charging station 2. To determine that the charging station connector 22 is coupled to the removable module 10 when the charge inlet 14 couples the removable module 10 to the charging station connector 22, the sensing circuitry 150 may detect a unique resistance that may exist between the electrically conductive terminal in the charge inlet 14 and the electrically conductive terminal in the charging station connector 22 when the electrically conductive terminal in the charge inlet 14 comes into contact with the electrically conductive terminal in the charging station connector 22. The sensing circuitry 150 may send a signal to the controller 140 when the sensing circuitry 150 detects the unique resistance between the electrically conductive terminal in the charge inlet 14 and the electrically conductive terminal in the charging station connector 22. When the controller 140 receives the signal from the sensing circuitry 150, the controller 140 may determine that the removable module 10 is coupled to the charging station 2.

To detect the coupling between the removable module 10 and the charging station connector 22 in Step S2, the sensing circuitry 150 may detect the presence of the electric power that the INV/PFC 110 receives from the charging station 2. The sensing circuitry 150 may send the signal to the controller 140 when the sensing circuitry 150 detects the presence of the electric power that the INV/PFC 110 receives from the charging station 2. When the controller 140 receives the signal from the sensing circuitry 150, the controller 140 may determine that the removable module 10 is coupled to the charging station 2.

To detect a coupling between the removable module 10 and the charging station connector 22 in Step S2, the charging station 2 may be equipped with a radio-frequency identification (RFID) chip and the sensing circuitry 150 may include an RFID reader that may read information stored in the RFID chip that is attached to the charging station 2. To determine that the removable module 10 is coupled to the charging station connector 22 when the charge inlet 14 couples the removable module 10 to the charging station connector 22, the RFID reader may wirelessly interrogate the RFID chip when the removable module 10 is brought into the proximity of the charging station 2. The sensing circuitry 150 may send the signal to the controller 140 when the RFID reader that is in the sensing circuitry 150 interrogates the RFID chip that is in the charging station 2 when the removable module 10 is brought into the proximity of the charging station 2. When the controller 140 receives the signal from the sensing circuitry 150, the controller 140 may determine that the removable module 10 is coupled to the charging station 2.

In the on-board charger mode of operation, the charge inlet 14 connects the INV/PFC 110 to the charging station connector 22 so that the INV/PFC 110 is connected to the charging station 2. Mating the charge inlet 14 with the charging station connector 22 couples the INV/PFC 110 to the charging station connector 22. When the controller 140 determines that the charging station connector 22 is coupled to the removable module 10 in Step S2, the controller 140 determines in Step S2 that the removable module 10 is in the on-board charger mode of operation and controls the INV/PFC 110 during the on-board charger mode of operation in a manner that causes the INV/PFC 110 to operate as power factor correction circuitry.

While the removable module 10 is connected to the charging station 2, the charging station 2 may supply the electric power to the INV/PFC 110 so that the INV/PFC 110 may receive the electric power from the charging station 2 in Step S3 of FIG. 4. Operating as the power factor correction circuitry, the INV/PFC 110 may reduce harmonic distortion in the electric power and may bring the power factor of the INV/PFC 110 close to 1.0.

The INV/PFC 110, when operating in Step S4 of FIG. 4 as the power factor correction circuitry during the on-board charger mode of operation, may convert the electric power that the removable module 10 receives from the charging station 2 into DC current. The INV/PFC 110, when operating as the power factor correction circuitry, outputs the DC current to the integrated DC/DC converter 120.

The integrated DC/DC converter 120 receives the DC current from the INV/PFC 110. Between the INV/PFC 110 and the integrated DC/DC converter 120 in FIG. 2 is a filter capacitor C1 that filters, from the DC current, high frequency components of the DC current before the integrated DC/DC converter 120 receives the DC current from the INV/PFC 110.

The integrated DC/DC converter 120 share the common circuitry 123, as illustrated in FIG. 3. To combine the DC/DC converter circuit 122 with the auxiliary power supply circuit 124, the portion of the circuitry in the integrated DC/DC converter 120 that converts the DC current into the DC energy is part of the circuitry in the auxiliary power supply circuit 124 that converts the DC current into the auxiliary voltage. When the integrated DC/DC converter 120 receives the DC current from the INV/PFC 110, the combination of the common circuitry 123 and the auxiliary power supply circuit 124 converts the DC current into the auxiliary voltage in Step S5 of FIG. 4. Also when the integrated DC/DC converter 120 receives the DC current from the INV/PFC 110, the combination of the DC/DC converter circuit 122 and the common circuitry 123 converts the DC current into the DC energy in Step S5 of FIG. 4. The DC energy is a voltage that differs from the auxiliary voltage. The common circuitry 123 in the integrated DC/DC converter 120 combines the DC/DC converter circuit 122 with the auxiliary power supply circuit 124 to reduce the cost of the removable module 10.

An auxiliary connector 121 in the integrated DC/DC converter 120 may couple the auxiliary load 13 to the integrated DC/DC converter 120 in a manner that permits the auxiliary connector 121 to a supply the auxiliary voltage from the auxiliary power supply circuit 124 to the auxiliary load 13 in Step S5.

During the on-board charger mode of operation, the controller 140 controls the first switch circuitry 160 in Step S6 of FIG. 4 in a manner that causes the first switch circuitry 160 to electrically disconnect the INV/PFC 110 from the energy storage device 130. The controller 140 also controls the second switch circuitry 170 in Step S6 in a manner that causes the second switch circuitry 170 to electrically connect a device output of the integrated DC/DC converter 120 to the energy storage device 130.

In Step S6, with the first switch circuitry 160 electrically disconnecting the INV/PFC 110 from the energy storage device 130 along with second switch circuitry 170 electrically connecting the integrated DC/DC converter 120 to the energy storage device 130, the integrated DC/DC converter 120 may supply the DC energy to the energy storage device 130 while simultaneously supplying the auxiliary voltage to the auxiliary load 13. When the integrated DC/DC converter 120 converts the DC current into the DC energy in Step S6, the integrated DC/DC converter 120 outputs the DC energy from the integrated DC/DC converter 120 to the energy storage device 130 so that the energy storage device 130 may store the DC energy. When the integrated DC/DC converter 120 converts the DC current into the auxiliary voltage in Step S6, the integrated DC/DC converter 120 outputs the auxiliary voltage to the auxiliary load 13 via the auxiliary connector 121. While the removable module 10 is detached from the vehicle 1, the wires 16 may connect the auxiliary connector 121 to the auxiliary load 13 so that the removable module 10 may output the auxiliary voltage to the auxiliary load 13 with the removable module 10 detached from the vehicle 1.

Manually disconnecting the charging station 2 from the removable module 10 in Step S11 of FIG. 4 causes the removable module 10 to terminate the on-board charger mode of operation.

The dashed line in FIG. 1 connecting the charge inlet 14 to the motor connector 12 is the inverter mode connection 17, which is one or more electrical connections between the motor 11 and the charge inlet 14. The inverter mode connection 17 may exist during the inverter mode of operation and is absent during the on-board charger mode of operation. The dashed line in FIG. 1 connecting the charge inlet 14 to the charging station connector 22 is the on-board charger mode connection 23 between the charging station connector 22 and the charge inlet 14 may exist during the on-board charger mode of operation. The on-board charger mode connection 23 is absent during the inverter mode of operation.

Prior to the inverter mode of operation, the removable module 10 is attached to the vehicle 1 so as to permit a coupling of the motor 11 to the INV/PFC 110. The inverter mode of operation commences when connecting the INV/PFC 110 to the motor 11 by manually mating the charge inlet 14 with the motor connector 12. Mating the charge inlet 14 with the motor connector 12 couples the INV/PFC 110 to the motor connector 12. In the inverter mode of operation, the charge inlet 14 connects the INV/PFC 110 to the motor connector 12 so that the motor 11 is connected to the INV/PFC 110. While the motor 11 is connected to the INV/PFC 110, the motor 11 receives the electric energy from the INV/PFC 110.

The latching mechanism 190 may connect the removable module 10 to the vehicle 1 in a manner that affixes the removable module 10 to the vehicle 1. The charge inlet 14 is configured in such a manner that, when the removable module 10 is affixed to the vehicle 1, mating the charge inlet 14 with the motor connector 12 inhibits a simultaneous mating of the removable module 10 to the charging station connector 22. The removable module 10 may output electric energy to the motor 11 while the removable module 10 is attached to the vehicle 1.

Connecting the removable module 10 to the motor 11 mates the charge inlet 14 with the motor connector 12, as shown by the dashed line in FIG. 1 connecting the charge inlet 14 to the motor connector 12. FIG. 4 shows that manually connecting the charge inlet 14 to the motor 11 in Step S1 may commence the inverter mode of operation.

When the motor 11 is connected to the removable module 10, the sensing circuitry 150 may detect that the removable module 10 is coupled to the motor connector 12 in a manner that permits the removable module 10 to determine in Step S2 of FIG. 4 that the removable module 10 is in the inverter mode of operation. In particular, with the removable module 10 attached to the vehicle 1, the sensing circuitry 150 may detect a coupling between the motor connector 12 and the removable module 10 in Step S2.

To detect the coupling between the removable module 10 and the motor connector 12 in Step S2, an electrically conductive terminal in the motor connector 12 may come into contact with the electrically conductive terminal in the charge inlet 14 when the removable module 10 is connected to the motor 11. To determine that the motor connector 12 is coupled to the removable module 10 when the charge inlet 14 couples the removable module 10 to the motor connector 12, the sensing circuitry 150 may detect a unique resistance that may exist between the electrically conductive terminal in the charge inlet 14 and the electrically conductive terminal in the motor connector 12 when the electrically conductive terminal in the charge inlet 14 comes into contact with the electrically conductive terminal in the motor connector 12. The sensing circuitry 150 may send the signal to the controller 140 when the sensing circuitry 150 detects the unique resistance between the electrically conductive terminal in the charge inlet 14 and the electrically conductive terminal in the motor connector 12. When the controller 140 receives the signal from the sensing circuitry 150, the controller 140 may determine that the removable module 10 is coupled to the motor 11.

To detect the coupling between the removable module 10 and motor connector 12 in Step S2, the sensing circuitry 150 may detect the presence of the electric energy that the INV/PFC 110 outputs to the motor 11 to determine that the motor 11 is coupled to the removable module 10. The sensing circuitry 150 may send the signal to the controller 140 when the sensing circuitry 150 detects the presence of the electric energy that the INV/PFC 110 outputs to the motor 11. When the controller 140 receives the signal from the sensing circuitry 150, the controller 140 may determine that the removable module 10 is coupled to the motor 11.

To detect a coupling between the removable module 10 and the motor connector 12 in Step S2, the motor 11 may be equipped with an RFID chip and the sensing circuitry 150 may include the RFID reader that may read information stored in the RFID chip that is attached to the motor 11. To determine that the removable module 10 is coupled to the motor connector 12 when the charge inlet 14 couples the removable module 10 to the motor connector 12, the RFID reader may wirelessly interrogate the RFID chip when the removable module 10 is brought into the proximity of the motor 11. The sensing circuitry 150 may send the signal to the controller 140 when the RFID reader that is in the sensing circuitry 150 interrogates the RFID chip that is in the motor 11 when the removable module 10 is brought into the proximity of the motor 11. When the controller 140 receives the signal from the sensing circuitry 150, the controller 140 may determine that the removable module 10 is coupled to the motor 11.

During the inverter mode of operation, the controller 140 in Step S7 of FIG. 4 controls the second switch circuitry 170 in a manner that causes the second switch circuitry 170 to electrically disconnect the integrated DC/DC converter 120 from the energy storage device 130. The controller 140, also in Step S7, controls the first switch circuitry 160 during the inverter mode of operation in a manner that causes the first switch circuitry 160 to electrically connect the energy storage device 130 to the INV/PFC 110 and the integrated DC/DC converter 120. The integrated DC/DC converter 120 receives the DC voltage from the energy storage device 130 in Step S7. The energy storage device 130 stores the DC energy.

The DC voltage is the DC energy that the energy storage device 130 outputs during the inverter mode Step S7. After receiving the DC voltage from the energy storage device 130 in Step S7, the combination of the common circuitry 123 and the auxiliary power supply circuit 124 converts the DC voltage into the auxiliary voltage in Step S8 of FIG. 4. To reduce the cost of the removable module 10, the integrated DC/DC converter 120 combines the DC/DC converter circuit 122 with the auxiliary power supply circuit 124. The auxiliary power supply circuit 124 may supply the auxiliary voltage to the auxiliary load 13 in Step S9 of FIG. 4. Through the auxiliary connector 121, the integrated DC/DC converter 120 may supply the auxiliary voltage to the auxiliary load 13 in Step S9.

The charge inlet 14 may couple the INV/PFC 110 to the motor connector 12 during the inverter mode of operation. The INV/PFC 110 may perform as the inverter when the charge inlet 14 couples the INV/PFC 110 to the motor 11. When the sensing circuitry 150 determines that the motor connector 12 is coupled to the INV/PFC 110 in Step S2, the controller 140 controls the INV/PFC 110 in Step S10 of FIG. 4 in a manner that causes the INV/PFC 110 to operate as the inverter. The inverter is circuitry that converts the DC voltage into the electric energy. The electric energy may be AC power when the motor 11 is an AC motor 11. When the motor 11 is a DC motor 11, the electric energy being the DC power is within the scope of the invention. The INV/PFC 110 may output the electric energy to the motor 11 in Step S10 when the INV/PFC 110 operates as the inverter.

The energy storage device 130 may output the DC voltage. When performing as the inverter that converts the DC voltage into the electric energy, the INV/PFC 110 may perform as a full-bridge inverter. Alternatively, the INV/PFC 110 performing as a half-bridge inverter that converts the DC voltage into the electric energy is also within the scope of the invention. The INV/PFC 110 may perform as a single-phase inverter that converts the DC electric energy into the electric energy, and may alternatively perform as a three-phase inverter that converts the DC electric energy into the electric energy.

Manually disconnecting the motor 11 from the removable module 10 in Step S11 of FIG. 4 causes the removable module 10 to terminate the inverter mode of operation.

The integrated DC/DC converter 120 is electrically connected directly to the INV/PFC 110 in each of the Steps S1-S11, which is during both the on-board charger mode of operation and the inverter mode of operation. The auxiliary load 13 may be electrically connected to the auxiliary connector 121 of integrated DC/DC converter 120 in any of the Steps S1-S11. Alternatively, disconnecting the auxiliary load 13 from the removable module 10 during any of the Steps S1-S6 and S11 is within the scope of the invention. Likewise, disconnecting the auxiliary load 13 from the removable module 10 during any of the Steps S1-S2 and S7-S11 is also within the scope of the invention.

While the removable module 10 is detached from the vehicle 1, the wires 16 may connect the auxiliary connector 121 to the auxiliary load 13 so that the removable module 10 may output the auxiliary voltage to the auxiliary load 13 with the removable module 10 detached from the vehicle 1.

Thus, embodiments described herein provide, among other things, a system for operating and charging a removable module 10 for a vehicle 1. This proposed system allows for a connection of the removable module 10 to a charging station 2 when the charging station 2 supplies electric power to the removable module 10. This system allows for a connection of the removable module 10 to a motor 11 when the removable module 10 supplies electric energy to the motor 11. It should be understood that the specific combination of functionality described herein are provided merely as examples and should not be construed as limiting.

What is claimed is:

1. A method for operating a removable module, the method comprising:
   connecting, via a multipurpose connector, the removable module to a motor when the removable module is attached to a vehicle;
   outputting, from dual-purpose circuitry of the removeable module when the dual-purpose circuitry is operating in a first mode, electric energy to the motor when the multipurpose connector connects the removable module to the motor of the vehicle;
   connecting, via the multipurpose connector, the removable module to electric vehicle supply equipment when the removable module is detached from the vehicle; and
   receiving, by the dual-purpose circuitry when the dual-purpose circuitry is operating in a second mode, electric power from the electric vehicle supply equipment when the multipurpose connector connects the removable module to the electric vehicle supply equipment, wherein the dual-purpose circuitry is configured to perform as an inverter while in the first mode and to perform as power factor correction circuitry in the second mode.

2. The method according to claim 1, further comprising:
   outputting, from combinational circuitry of the removable module, an auxiliary voltage to an auxiliary load when the combinational circuitry converts DC current into the auxiliary voltage.

3. The method according to claim 2, further comprising:
   converting, by the dual-purpose circuitry, the electric power into the DC current.

4. The method according to claim 2, further comprising:
   outputting, from the combinational circuitry, DC energy to an energy storage device when the combinational circuitry converts the DC current into the DC energy.

5. The method according to claim 4, further comprising:
   converting, by the dual-purpose circuitry when the dual-purpose circuitry receives an inverter mode connection DC voltage from the energy storage device, the DC voltage into the electric energy.

6. The method according to claim 5, wherein the energy storage device stores the DC energy as the DC voltage.

7. The method according to claim 5, further comprising:
   outputting, when the combinational circuitry converts the DC voltage into the DC energy, the auxiliary voltage from the combinational circuitry to the auxiliary load.

8. The method according to claim 1, further comprising:
   detecting, by sensing circuitry when the multipurpose connector connects the removable module to the electric vehicle supply equipment, a connection between the removable module and the electric vehicle supply equipment.

9. The method according to claim 8, further comprising:
   detecting, by the sensing circuitry when the multipurpose connector connects the removable module to the motor, a connection between the removable module and the motor.

* * * * *